(12) United States Patent
Lan

(10) Patent No.: US 6,619,679 B2
(45) Date of Patent: Sep. 16, 2003

(54) POWER SCOOTER FRAME STRUCTURE

(76) Inventor: Mey-Chu Lan, 7F, No. 6, Lane 20, Sec. 4, San Ho Rd., San-Chung City, Taipei Hsien (TW)

( * ) Notice: Subject to any disclaimer, the term of this patent is extended or adjusted under 35 U.S.C. 154(b) by 9 days.

(21) Appl. No.: 09/924,750

(22) Filed: Aug. 7, 2001

(65) Prior Publication Data

US 2003/0029652 A1 Feb. 13, 2003

(51) Int. Cl.[7] .............................................. A63C 17/12
(52) U.S. Cl. ................................ 280/87.05; 280/87.01; 180/181
(58) Field of Search ................................ 180/180, 181, 180/65.1, 68.5; 280/87.01, 87.021, 87.041, 87.042, 87.05

(56) References Cited

U.S. PATENT DOCUMENTS

| 1,771,813 | A | * | 7/1930 | Norman | 280/87.01 |
|---|---|---|---|---|---|
| 3,052,481 | A | * | 9/1962 | Kaufman | 280/87.05 |
| 5,236,058 | A | * | 8/1993 | Yamet et al. | 180/181 |
| 5,310,202 | A | * | 5/1994 | Goodspeed | 280/87.042 |
| 5,848,660 | A | * | 12/1998 | McGreen | 280/87.041 |
| 6,182,988 | B1 | * | 2/2001 | Wu | 280/87.05 |
| 6,193,248 | B1 | * | 2/2001 | Liu | 280/87.041 |
| 6,227,324 | B1 | * | 5/2001 | Sauve | 180/181 |
| 6,443,470 | B1 | * | 9/2002 | Ulrich et al. | 280/87.041 |

FOREIGN PATENT DOCUMENTS

FR 2617455 * 1/1989 ................ 180/181

* cited by examiner

*Primary Examiner*—Frank Vanaman

(57) ABSTRACT

A power scooter has a base frame which defines a battery chamber. The battery chamber holds a storage battery, and the power scoter has a footplate on which a power scooter rider stands thereon is pivoted to the base frame and the footplate can be turned relative to the base frame to close/open the battery chamber.

1 Claim, 7 Drawing Sheets

POWER SCOOTER FRAME STRUCTURE

BACKGROUND OF THE INVENTION

The present invention relates to power scooters and, more particularly, to a frame structure for a power scooter.

FIGS. 1 and 2 show a combination frame structure for a kick scooter according to the U.S. Pat. Ser. No. 09/885,766. This combination frame structure is comprised of a base frame supported on a rear wheel, the base frame having two parallel side frame plates, a bottom plate connected between the side frame plates, supported on a rear wheel, a mounting frame fixedly fastened to the base frame remote from the rear wheel, a plurality of screw bolts fastened to the side frame plates of the base frame and the mounting frame to secure the mounting frame and the side frame plates together, and a head tube and handlebar assembly pivoted to the mounting frame and holding a front wheel. According to this design, a motor drive system can be installed in the base frame and controlled to drive the rear wheel. However, when a motor drive system is installed in the base frame, the storage battery of the motor drive system is exposed to the outside and tends to be damaged. FIG. 3 shows a power scooter according to the prior art. This structure of power scooter has a footplate A fixedly fastened to the base frame C by screws B to close the battery camber. When voltage of the battery is low, the footplate A must be opened so that the user can be accessible to the storage battery in the battery camber. However, because the footplate is fixedly fastened to the base frame C by screws B, it is complicated to open the footplate.

SUMMARY OF THE INVENTION

Accordingly, it is one object of the present invention to provide a power scooter frame structure, which uses the footplate to protect the storage battery. It is another object of the present invention to provide a power scooter frame structure, which has its footplate openable, so that the user can conveniently get to the storage battery to charge the storage battery or to replace it.

DETAILED DESCRIPTION OF THE PREFERRED EMBODIMENT

Figure 1:
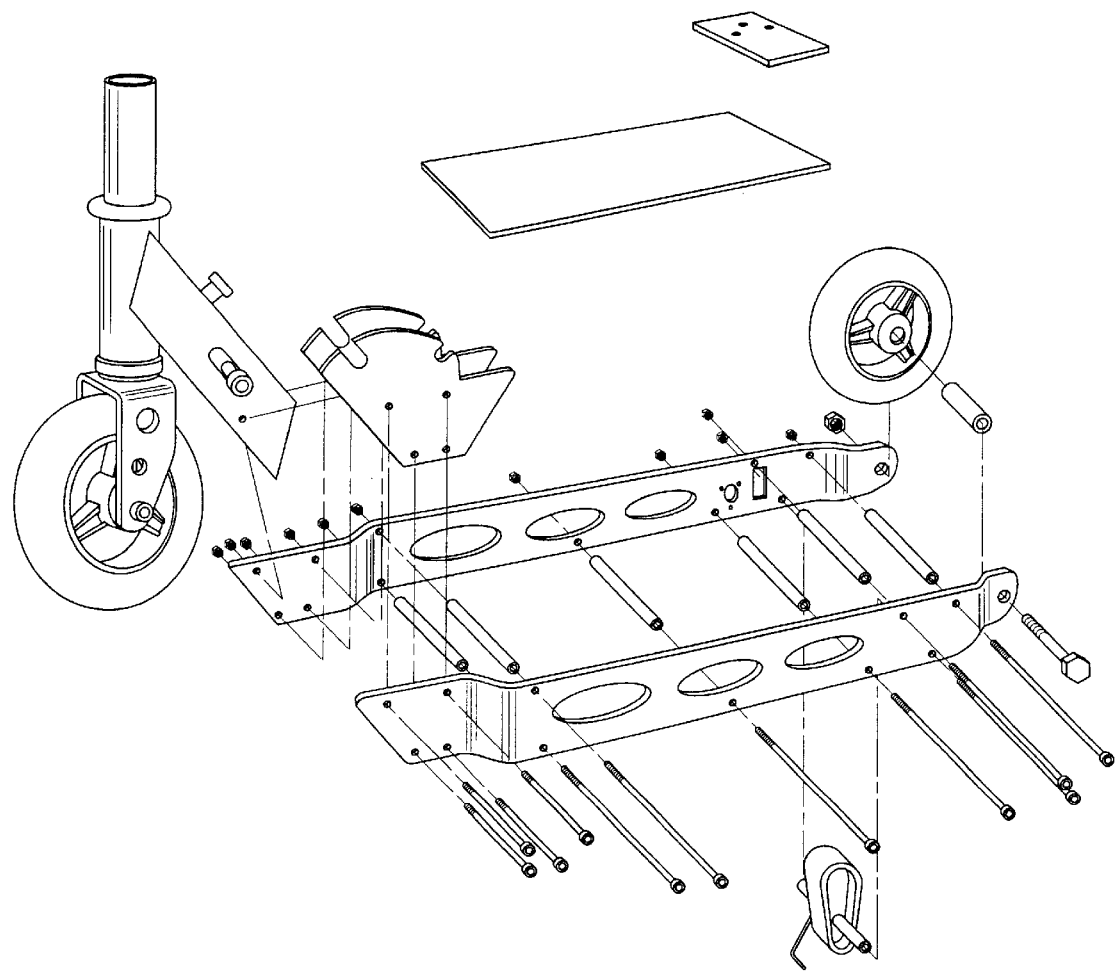
FIG. 1 is an exploded view of a combination frame structure for kick scooter according to the U.S. Pat. Ser. No. 09/885,766.
Figure 2:
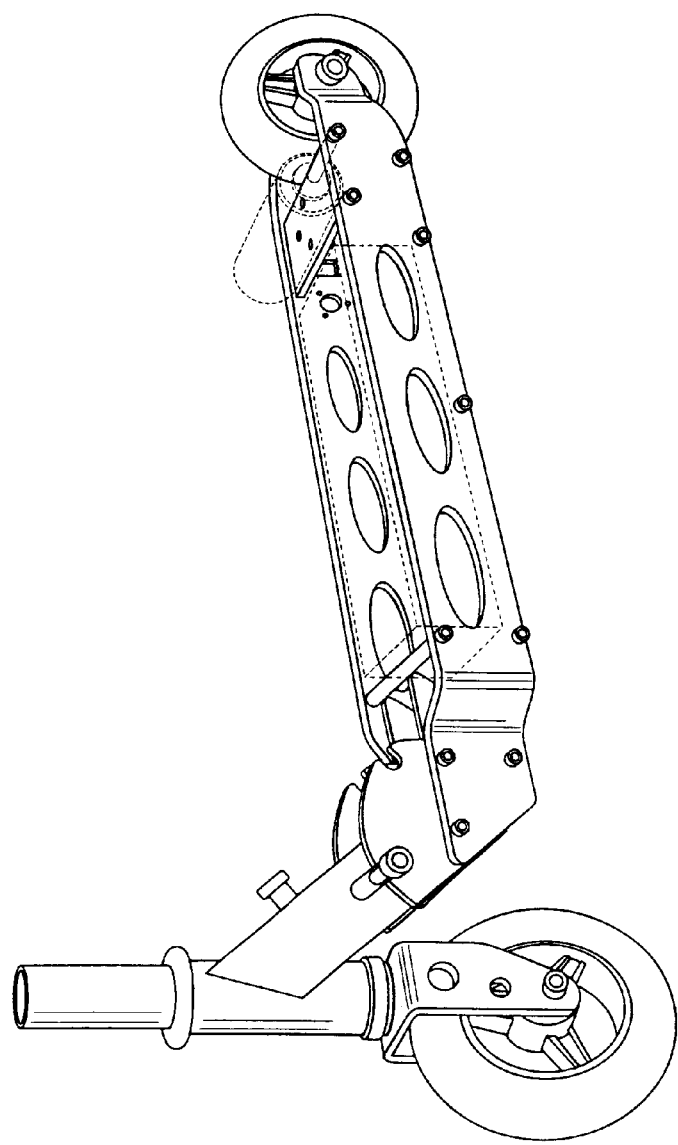
FIG. 2 is a perspective assembly view of the combination frame structure for kick scooter of FIG. 1.
Figure 3:
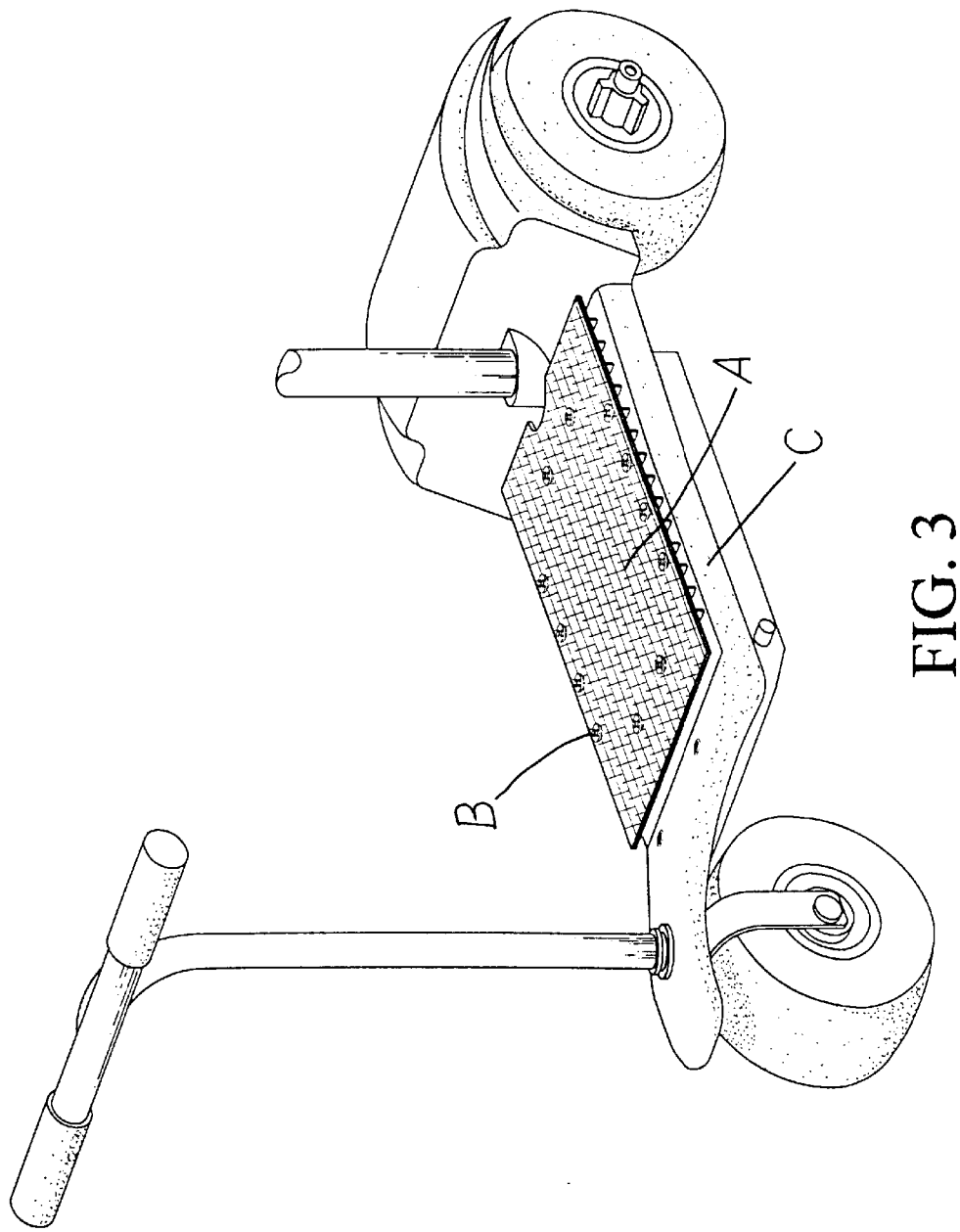
FIG. 3 is an elevational view of a power scooter constructed according to the prior art.
Figure 4:
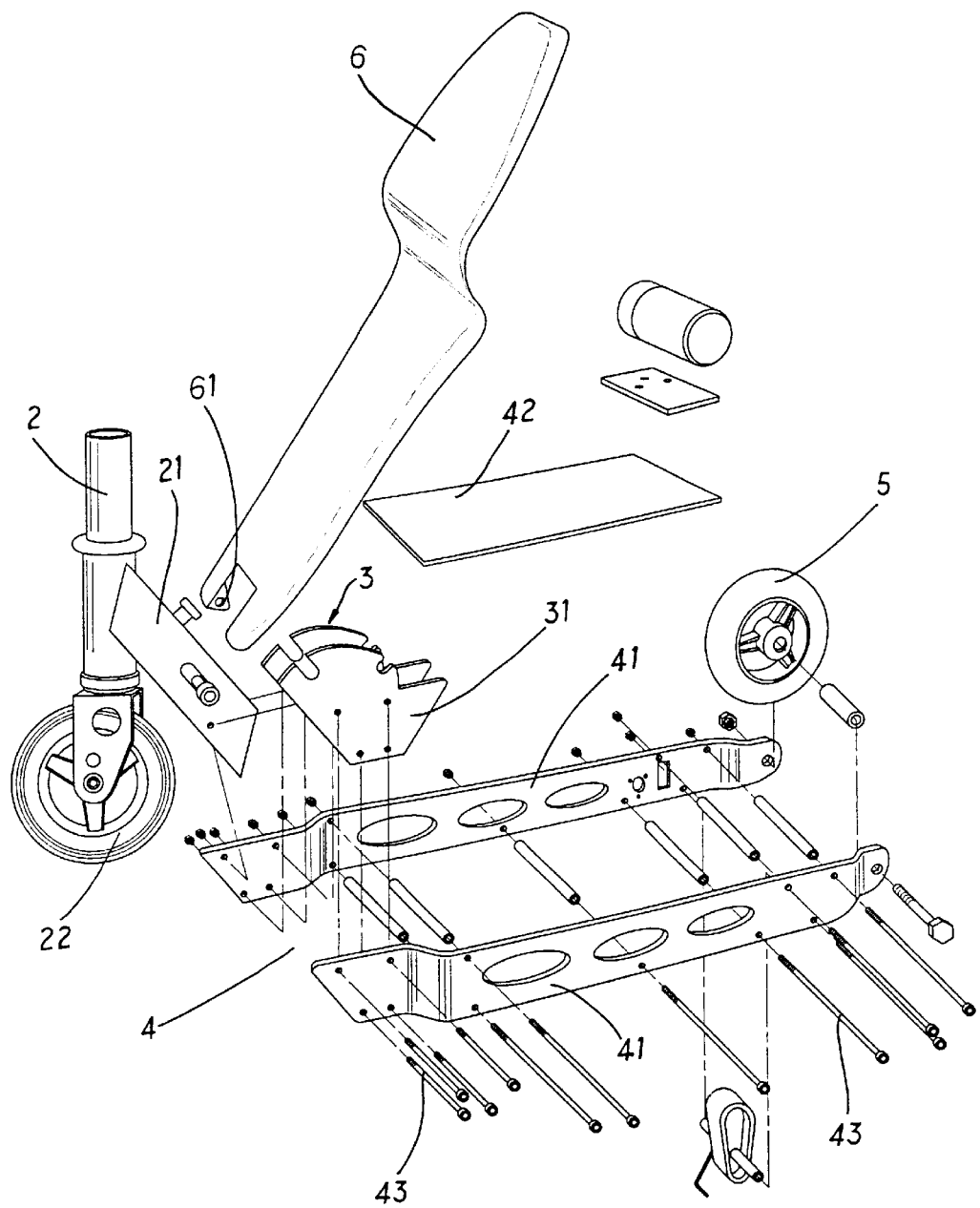
FIG. 4 is an exploded view of a power scooter frame structure according to the present invention.
Figure 5:
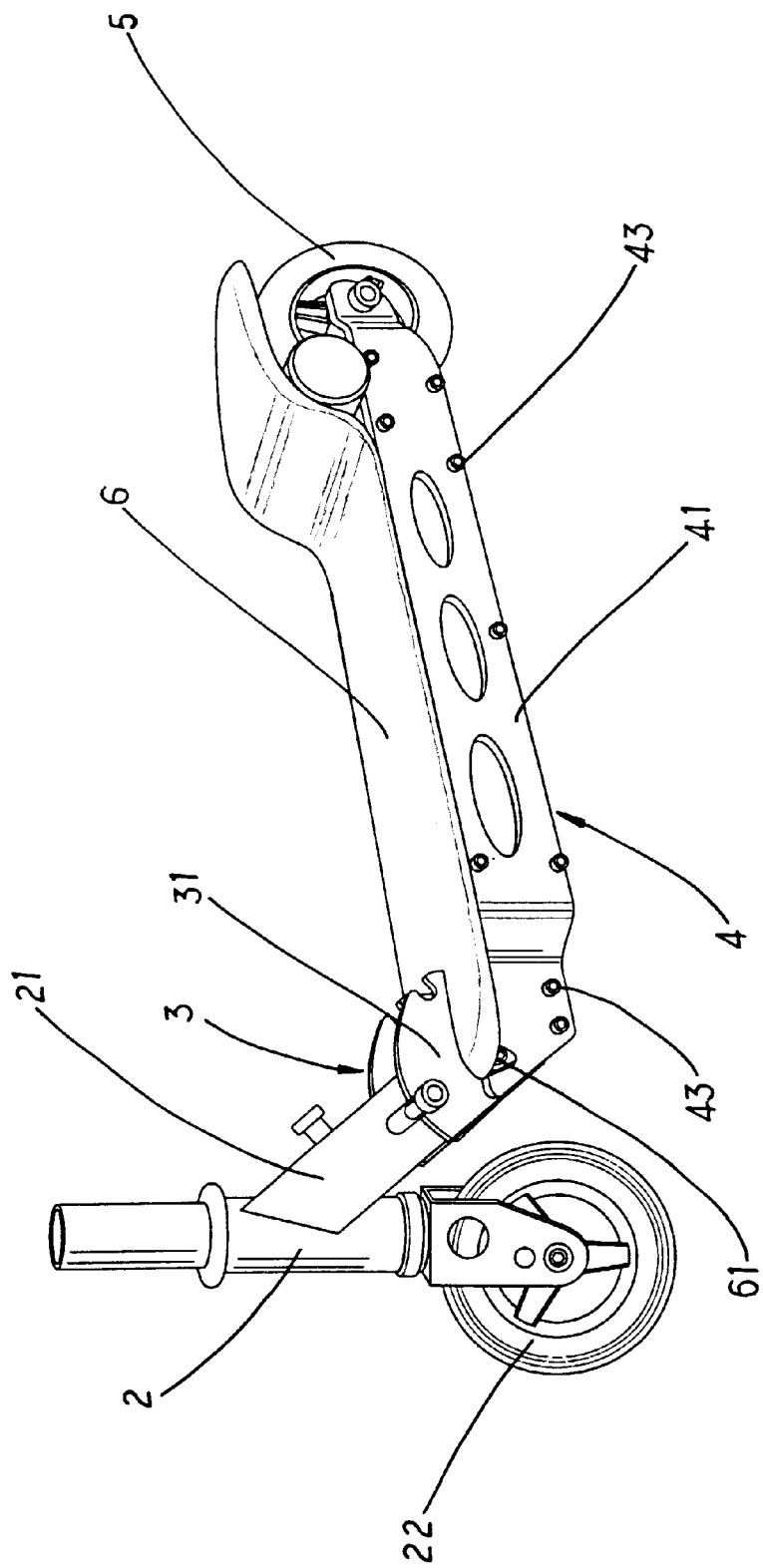
FIG. 5 is an assembly view of the present invention, showing the footplate being closed.
Figure 6:
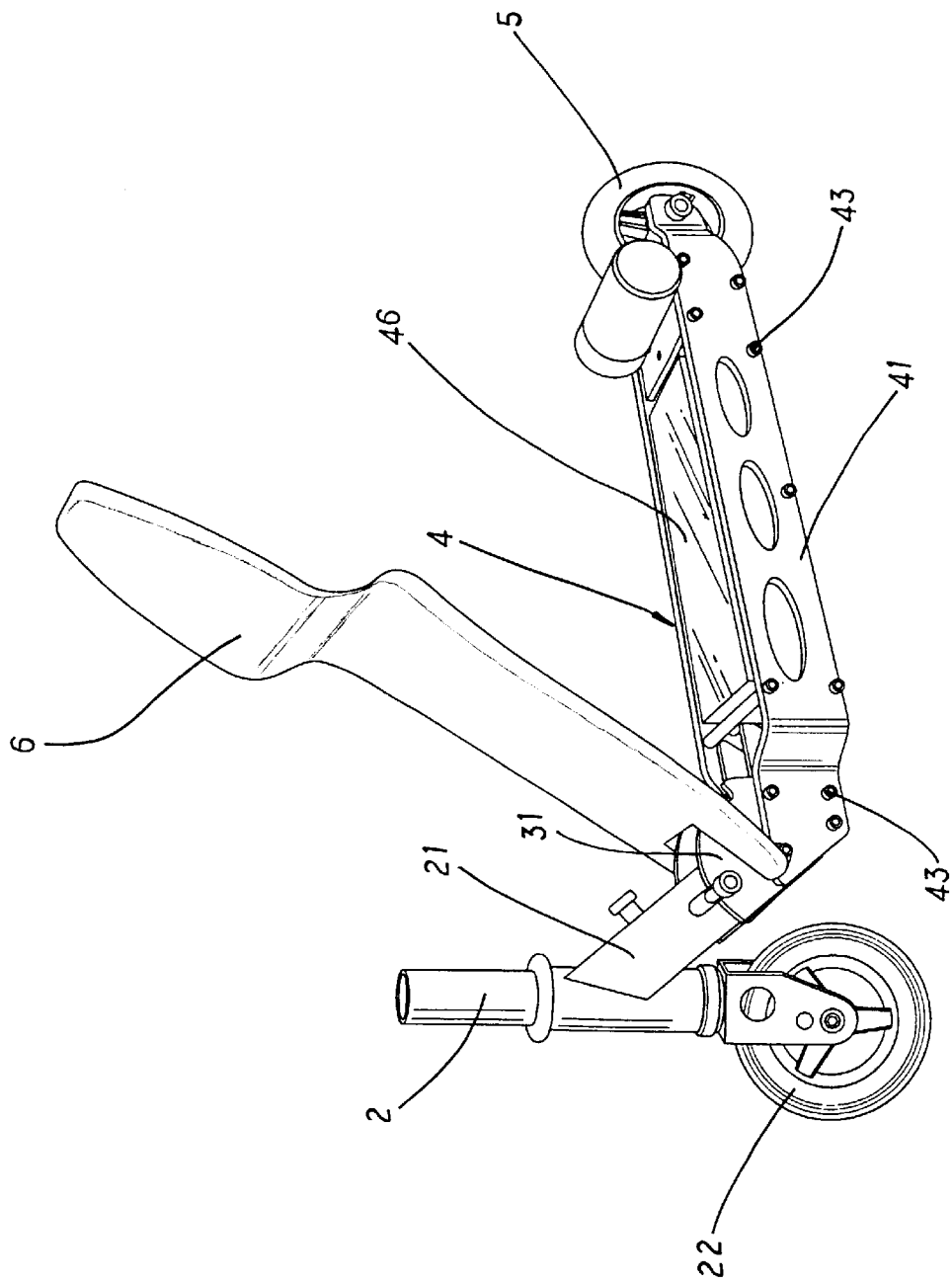
FIG. 6 is similar to FIG. 5 but showing the footplate being opened.

Referring to FIGS. 4 to 6, a power scooter frame structure in accordance with the present invention is generally comprised of a head tube and handlebar assembly 2, a mounting frame 3, and a base frame 4: The head tube and handlebar assembly 2 is supported on a front wheel 22, having a connecting bar 21 obliquely extended from the head tube thereof. The base frame 4 has a rear side supported on a rear wheel 5, and a front side thereof is coupled to the head tube and handlebar assembly 2. The mounting frame 3 is connected between the front side of the base frame 4 and the connecting bar 21 of the head tube and handlebar assembly 2. The mounting frame 3 comprises two sector-like side plates 31 arranged in parallel. The sector-like side plates 31 are fastened to the base frame 4. The connecting bar 21 of the head tube and handlebar assembly 2 is connected between the sector-like side plates 31 of the mounting frame 3.

The base frame 4 is comprised of two parallel side frame plates 41, and a bottom plate 42. The side frame plates 41 are fastened together by screw bolts 43. The bottom plate 42 is horizontally supported on the screw bolts 43 between the side frame plates 41. Further, the side frame plates 41 have respective front and rear sides curved inwards such that a narrow opening is respectively provided at the front side as well as the rear side of the base frame 4 between the side frame plates 41 for receiving the mounting frame 3 and the rear wheel 5. A storage battery 46 is replaceably mounted on the bottom plate 4 between the side frame plates 41 (the side frame plates 41 and the bottom plate 42 define a battery chamber adapted to hold the storage battery 46), and adapted to provide the necessary working voltage to the motor (not shown) of the power scooter. A footplate 6 is covered on the base frame 4 to protect the storage battery 46 and to keep the storage battery 46 from sight. The footplate 6 has a forked front side 61 pivoted to the sector-like side plates 31 of the mounting frame 3. Because the footplate 6 is pivoted to the sector-like side plates 31 of the mounting frame 3, it can be opened from the base frame 4 when charging or replacing the storage battery 46.

Figure 7:
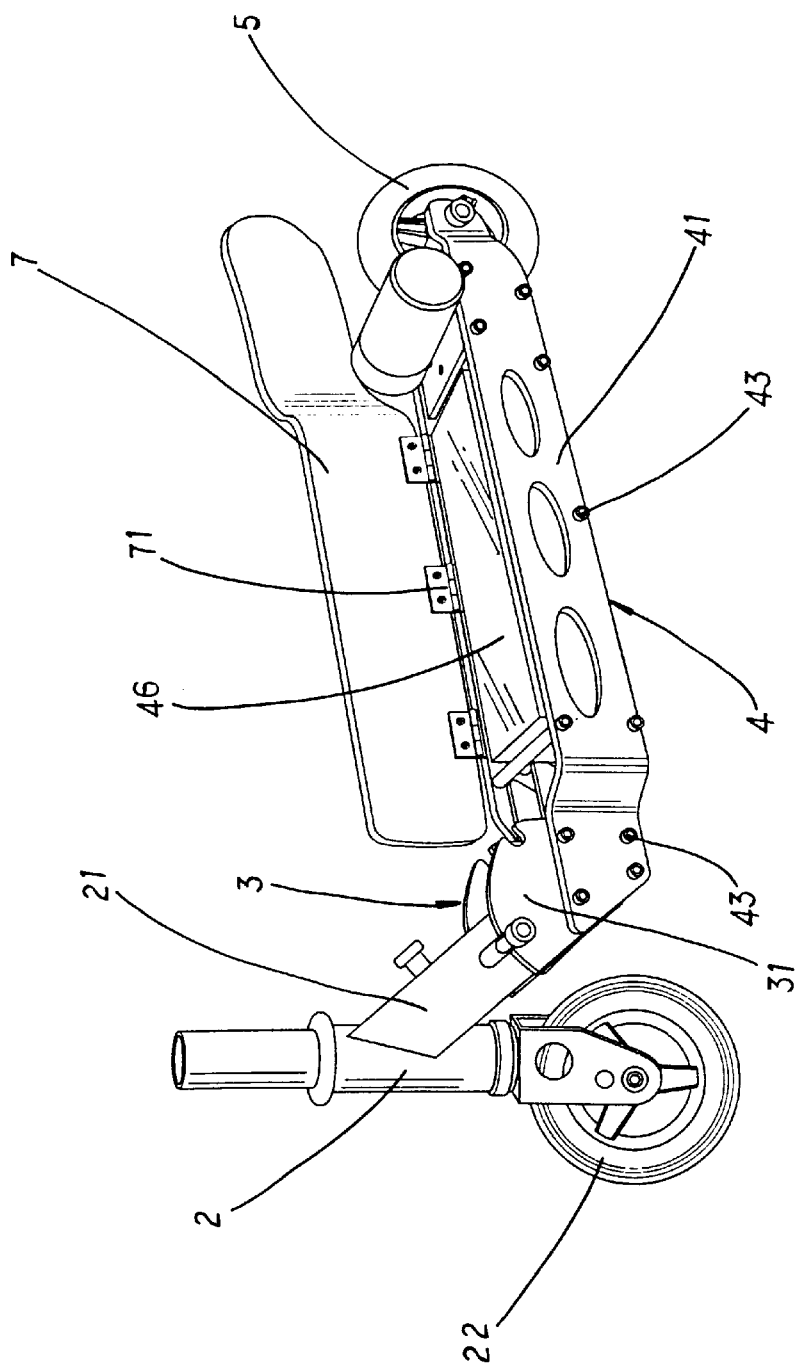
FIG. 7 shows an alternate form of the power scooter frame structure according to the present invention.

FIG. 7 shows an alternate form of the present invention. According to this alternate form, the footplate 7 is hinged to one side frame plate 41 of the base frame 4 by hinges 71, and turned to close/open the battery storage chamber defined between the side frame plates 41 and the bottom plate 42.

A prototype of power scooter has been constructed with the features of FIGS. 4–7. The power scooter functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A power scooter frame structure comprising a base frame, said base frame comprising two vertical side frame plates and a horizontal bottom plate connected between said vertical side frame plates near a bottom side and defining with said vertical side frame plates a battery chamber, which holds a storage battery, a mounting frame fixedly fastened to a front side of said base frame, and a head tube and handlebar assembly holding a front wheel, said head tube and handlebar assembly comprising a connecting bar obliquely extended from a head tube thereof and pivoted to said mounting frame, wherein a footplate is coupled to said base frame and turnable with respect to said base frame between a first position where said footplate closes said battery chamber for enabling the power scooter rider to stand on said footplate, and a second position where said footplate is opened from said battery chamber for enabling the power scooter rider to charge the storage battery installed in said battery chamber;

wherein said footplate has a forked front end pivoted to said mounting frame.

* * * * *